(12) United States Patent
Kim et al.

(10) Patent No.: US 7,542,386 B2
(45) Date of Patent: Jun. 2, 2009

(54) OPTICAL DISC PLAYER, METHOD, AND MEDIA COMPENSATING FOR TILT/SKEW USING RF ENVELOPE

(75) Inventors: Min-seok Kim, Suwon-si (KR); Kyung-pil Kang, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 638 days.

(21) Appl. No.: 11/175,691

(22) Filed: Jul. 7, 2005

(65) Prior Publication Data

US 2006/0007831 A1  Jan. 12, 2006

(30) Foreign Application Priority Data

Jul. 7, 2004 (KR) .................. 10-2004-0052576

(51) Int. Cl.
*G11B 7/00* (2006.01)
(52) U.S. Cl. ........................... 369/44.32; 369/53.19
(58) Field of Classification Search .......... 369/44.32, 369/53.12, 53.13, 53.14, 53.15, 53.19
See application file for complete search history.

(56) References Cited

U.S. PATENT DOCUMENTS

| | | | |
|---|---|---|---|
| 5,881,034 A | | 3/1999 | Mano et al. |
| 6,137,754 A | * | 10/2000 | Furukawa et al. ........ 369/44.32 |
| 6,587,409 B1 | | 7/2003 | Yamazaki et al. |
| 6,680,886 B1 | * | 1/2004 | Naohara et al. ........ 369/44.32 |
| 7,174,631 B2 | * | 2/2007 | Hsu et al. ............... 29/848 |
| 7,187,636 B2 | * | 3/2007 | Kato et al. ............. 369/53.19 |
| 7,263,041 B2 | * | 8/2007 | Lin et al. .............. 369/44.32 |
| 7,307,929 B2 | * | 12/2007 | Ohno ................... 369/44.32 |
| 2003/0179665 A1 | | 9/2003 | Iwazawa et al. |
| 2004/0114479 A1 | | 6/2004 | Yamamoto et al. |

FOREIGN PATENT DOCUMENTS

| | | |
|---|---|---|
| EP | 0 806 767 | 11/1997 |
| JP | 11-273114 | 10/1999 |
| JP | 2000-311350 | 7/2000 |
| KR | 2000-0033029 | 6/2000 |
| KR | 2000-0050358 | 8/2000 |
| KR | 10-2002-0039505 | 5/2002 |
| KR | 10-2004-0004830 | 1/2004 |
| KR | 10-2004-0016502 | 2/2004 |

OTHER PUBLICATIONS

Korean Office Action dated Feb. 3, 2006 for Korean App. No. 10-2004-0052576.

(Continued)

*Primary Examiner*—Nabil Z Hindi
(74) *Attorney, Agent, or Firm*—Staas & Halsey LLP

(57) ABSTRACT

An optical disc player for recording/reproducing data on an optical disc, including an optical pickup unit emitting a laser beam to the surface of the optical disc and extracting an RF signal corresponding to the recorded data, a signal size computing unit computing an envelope size of the RF signal, a tilt adjuster adjusting a tilt of the optical disc, and a controller for designating the tilt at a maximum envelope size as an optimal tilt, and controlling the tilt adjuster to change a present tilt based on the optimal tilt. Similarly, it is also possible to designate an optimal skew based on the skew at a maximum envelope size. Accordingly, embodiments of the present invention make it possible to obtain the optimal tilt/skew using the RF envelope.

8 Claims, 7 Drawing Sheets

OTHER PUBLICATIONS

European Office Communication issued Jun. 14, 2007 in corresponding European Patent Application No. 05254254.5-1232.
European Search Report for Application No. 05 25 4254.
Chinese Office Action dated Sep. 1, 2006 for related Chinese Patent Application No. 2005100832386.

* cited by examiner

OPTICAL DISC PLAYER, METHOD, AND MEDIA COMPENSATING FOR TILT/SKEW USING RF ENVELOPE

CROSS-REFERENCE TO RELATED APPLICATIONS

This application claims benefit under 35 U.S.C. § 119 from Korean Patent Application No. 2004-52576, filed on Jul. 7, 2004, the entire content of which is incorporated herein by reference.

BACKGROUND OF THE INVENTION

1. Field of the Invention

Embodiments of the present invention relate in general to recording and/or reproducing apparatuses, e.g., an optical disc player, compensating for a tilt/skew, and method and media thereof. More specifically, embodiments of the present invention relate to an optical disc player compensating for a tilt/skew using an RF envelope detected from an optical disc, and methods and media thereof.

2. Description of the Related Art

As computers become prevalent in every part of our daily lives, the need has increased for as many peripherals and components as possible to increase the effectiveness and the performance of computers. Particularly, diverse types of auxiliary storage media are available, e.g., storing programs and stored data of the computer's memory in the event of computer power supply cut-off. Typical examples of the auxiliary storage media include magnetic storage media and optical disc storage media.

The magnetic storage media, such as floppy disks and hard disks use a magnetic field to record data. However, the capacities of such magnetic storage media are so small that multiple magnetic storage media have to be used to store multimedia data now being generated. To increase the storage capacity of the magnetic disc, an optical disc (or a laser disc) with a relatively large storage capacity and high data retrieval speed has been developed and is now in use. The optical discs can include CD-ROMs and DVDs (digital video discs), for example.

The optical disc is a recording medium recording data thereon or for playing back (reproducing) data therefrom by applying an optical operation. The optical disc has a support base on which data (i.e., data bits '1' or '0') is recorded by laser beams in pit trains on a track, for example. This data can generally accessed or retrieved by detecting a reflected light or an incident light obtained from the illumination with the laser beam, for example.

To record/reproduce data stably on/from a high-density optical disc such as a DVD-ROM, the optical axis of the laser beam emitted onto the optical disc is usually desired to be perpendicular to the surface of the optical disc, that is, the declination angle of the optical axis is perpendicular to the surface of the optical disc. In practice, however, the surface of the disc is sometimes distorted or tilted, and a skew may occur to the optical pickup unit that emits the laser beam. When this occurs, the emission angle of the laser beam (signal) is not perpendicular. As a result, jitter occurs during the reproduction of data. Jitter is a time-based error caused by the vibration of data signals reproduced from the recording medium. Jitter can cause deteriorations in the processing capability of a control unit or a substantial loss of data in a synchronized network due to the lack of processing capability for reproduced signals. Therefore, it is best to reduce the amount of jitter as much as possible.

FIG. 1 is a graph illustrating a relationship between the amount of jitter and the tilt/skew in a related art optical disc player. Here, to set an optical tilt/skew the amount of jitter is measured in a given range while changing the tilt/skew. The changes in the amount of jitter is reflected in the graph of FIG. 1. Therefore, it is possible to adjust the tilt value or the skew value to the point that the jitter is reduced to a minimum.

However, for the compensation of the tilt/skew in the related art optical disc player the jitter measurement had to be done separately. In other words, a certain amount of data was needed to measure jitter, and for a more reliable measurement the same interval was played back repeatedly, which consequently caused delays in data reproduction. In addition, because the jitter had to be computed after processing the reproduced data, the operation itself was a burden. And most importantly, an operation system for accurate measurement of jitter was necessary, and the normal function could be performed only for the jitter measurement with high discriminability.

In the meantime, Japanese Patent Laid-Open Publication Nos. 9-212891 and 9-245357 disclose methods for compensating a tilt using a separate tilt sensor. According to these disclosures, the tilt of the optical pickup unit is detected not through the operation of jitter but with the help of the tilt sensor. However, using the tilt sensor means that the light source cannot be installed at the same position with the tilt sensor. As a result, an accurate tilt angle cannot be obtained, and the entire size of the optical disc player is increased.

SUMMARY OF THE INVENTION

It is, therefore, an aspect of the present invention is to provide an optical disc player compensating a tilt/skew using an envelope of an RF signal reproduced from the optical disc player, and methods and media thereof.

To achieve the above and/or other aspects and advantages, embodiments of the present invention include an optical disc player recording and/or reproducing data recorded on an optical disc, including an optical pickup unit to emit a laser beam to a surface of the optical disc and extract an RF signal, from the laser beam reflected from the surface of the optical disc, corresponding to the data, a signal size computing unit to compute an envelope size of the RF signal, a tilt adjuster to adjust a tilt of the optical disc, and a controller to designate a tilt of the optical disc at a maximum envelope size as an optimal tilt, and to control the tilt adjuster to change a present tilt of the optical disc based on the optimal tilt.

The optical disc player may further include a memory to store the designated tilt and the computed envelope size corresponding to the designated tilt. The controller may compute the envelope size while changing the present tilt, within a predetermined range, store the envelope size in the memory, extract from the memory the designated tilt, and designate the designated tilt as the optimal tilt. In addition, the computed envelope sizes may not be stored together.

To achieve the above and/or other aspects and advantages, embodiments of the present invention include an optical disc player for recording and/or reproducing data recorded on an optical disc, including an optical pickup unit to emit a laser beam to a surface of the optical disc and extract an RF signal, from the laser beam reflected from the surface of the optical disc, corresponding to the data, a signal size computing unit to compute an envelope size of the RF signal, a skew adjuster to adjusts a skew of the optical pickup, and a controller to designate the skew of the optical pickup at a maximum envelope size as an optimal skew, and to control the skew adjuster to change a present skew of the optical pickup based on the optimal skew.

The optical disc player may include a memory to store the designated skew and the computed envelope size corresponding to the designated skew. The controller may compute the envelope size while changing the current skew within a predetermined range, store the envelope size in the memory, extract from the memory the designated skew, and designat the designated skew at the maximum envelope size as the optimal skew.

In addition, the skew adjuster may also apply a drive signal to at least one focusing coil to adjust skew of the optical pickup.

To achieve the above and/or other aspects and advantages, embodiments of the present invention include a method for compensating a tilt of an optical disc player for recording and/or reproducing data recorded on an optical disc, including emitting a laser beam to a surface of the optical disc and extracting an RF signal, from the laser beam reflected from the surface of the optical disc, corresponding to the data, computing an envelope size of the RF signal, adjusting a tilt of the optical disc within a predetermined range, and repeating the emitting of the laser beam, extracting of the RF signal, and the computing of the envelope size, and designating the tilt of the optical disc at a maximum envelope size as an optimal tilt, and changing a present tilt of the optical disc based on the optimal tilt.

The method may include storing each computed envelope size of the RF signal.

To achieve the above and/or other aspects and advantages, embodiments of the present invention include a method for compensating a skew of an optical disc player for recording and/or reproducing data recorded on an optical disc, including emitting a laser beam to a surface of the optical disc and extracting an RF signal, from Ithe laser beam reflected from the surface of the optical disc, corresponding to the data, computing an envelope size of the RF signal, adjusting a skew of an optical pickup up the optical disc player, within a predetermined range, repeating the emitting of the laser beam, extracting of the RF signal, and the computing of the envelope size, and designating the skew of the optical pickup at a maximum envelope size as an optimal skew, and changing a present skew of the optical pickup based on the optimal skew.

The adjusting of skew of the optical pickup may include applying a drive signal to at least one focusing coil.

To achieve the above and/or other aspects and advantages, embodiments of the present invention include media including computer readable code/instructions implementing embodiments of the present invention.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
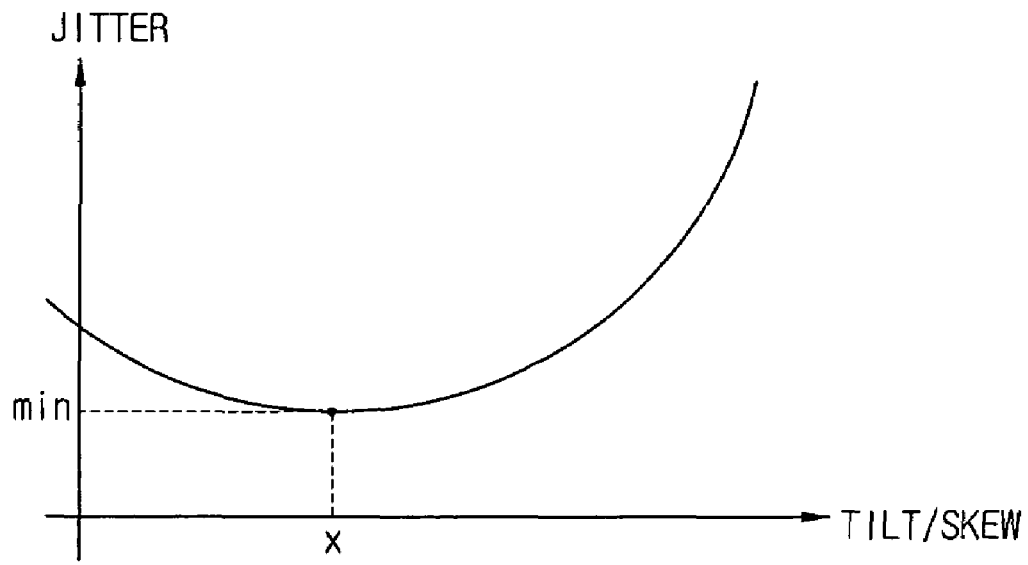
FIG. 1 illustrates changes in jitter for setting an optimal tilt/skew in a related art optical disc player.

Reference will now be made in detail to the embodiments of present invention, examples of which are illustrated in the accompanying drawings, wherein like reference numerals refer to the like elements throughout. The embodiments are described below to explain the present invention by referring to the figures.

Figure 2:
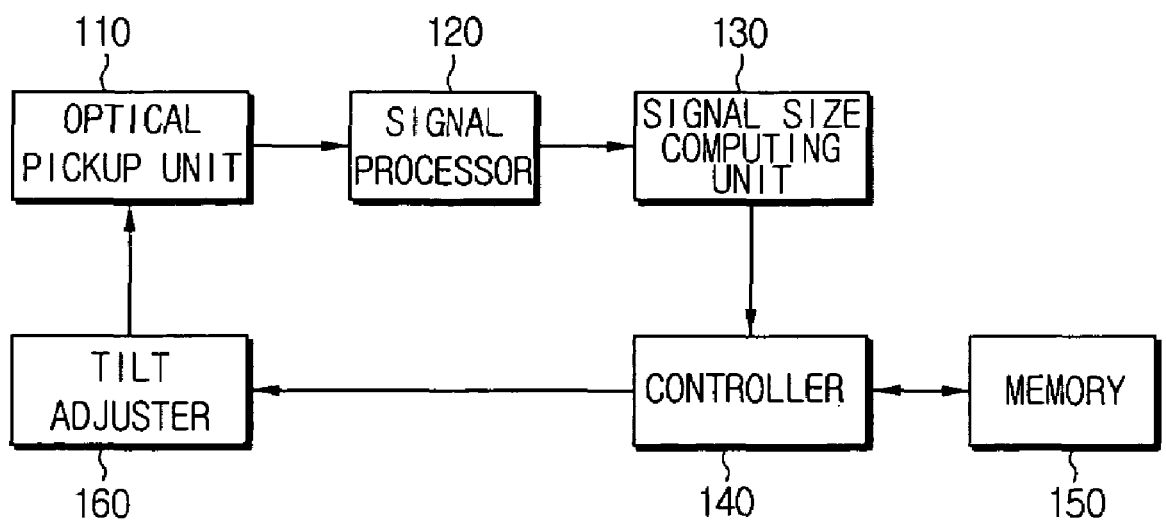
FIG. 2 illustrates a schematic block diagram for an optical disc player, according to an embodiment of the present invention.

FIG. 2 illustrates a schematic block diagram of an optical disc player, according to an embodiment of the present invention. As shown in FIG. 2, the optical disc player may include an optical pickup unit 110, a signal processor 120, a signal size computing unit 130, a controller 140, a memory 150 and a tilt adjuster 160.

The optical pickup unit 110 emits a laser beam to the surface of the optical disc to record/reproduce data. That is, the optical pickup unit 110 can emit the laser beam to a track on the surface of the optical disc to form a pit train, and records a data bit '1' or '0' thereon, for example, or reproduces an RF (Radio Frequency) signal corresponding to data on the surface of the optical disc. To this end, the optical pickup unit 110 can include a light source emitting a laser beam, and an actuator that adjusts tracking and focusing of the optical pickup unit 110. More details on the make up of the optical pickup unit 110 will be described later with reference to FIG. 3B.

Recorded data can be accessed by emitting the laser beam to the surface of the optical disc. Then the laser beam is reflected by the recorded data on the track, the reflected beam is detected, and the detection of the reflected beam is output as a RF signal. This RF signal is then sent to the signal processor 120 where it is equalized, sampled and converted to digital data.

The signal size computing unit 130 can compute the envelope size of a sample RF signal from the signal processor 120. The envelope size is the difference between a maximum RF signal and a minimum RF signal being sampled.

The tilt adjuster 160 can adjust the declination angle (i.e., the tilt angle) of the optical disc. More details on the tilt adjustment will be provided below.

The controller 140 can control the tilt adjuster 160 and the optical pickup unit 110 to change the tilt, within a predetermined range, and reproduce data. As described above, when the data is reproduced from the optical disc, the signal size computing unit 130 computes the envelope size of the RF signal. The envelope size is then recorded in the memory 150.

In addition, the controller 140 detects the maximum envelope size, and designates the tilt at the maximum envelope size as an optimal tilt. In other words, the RF signal changes according to the changes in the tilt, and the envelope size of the RF signal has a maximum value when the optical axis of the laser beam emitted from the optical pickup unit 110 is perpendicular to the surface of the optical disc. Therefore, the controller 140 designates the tilt at the maximum envelope size as the optimal tilt. Later, the controller 140 controls the tilt adjuster 160 to adjust to the recognized optimal tilt. In this manner, the tilt of the optical disc can be compensated to the optimal value.

Figure 3:
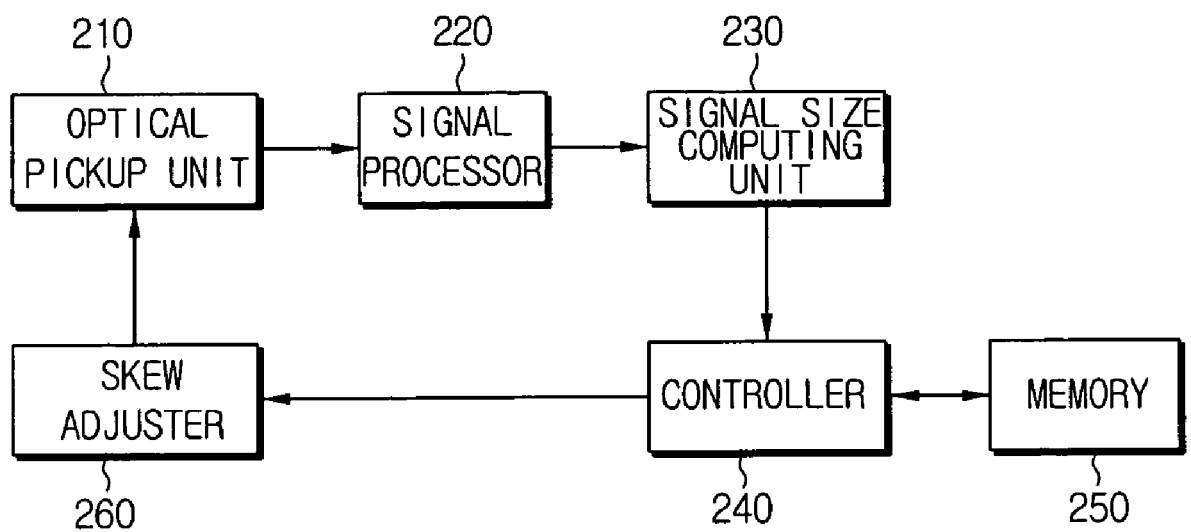
FIG. 3 illustrates a schematic block diagram for an optical disc player, according to another embodiment of the present invention.

FIG. 3 illustrates a schematic block diagram of an optical disc player, according to another embodiment of the present invention. As shown in FIG. 3, the optical disc player includes an optical pickup unit 210, a signal processor 220, a signal size computing unit 230, a controller 240, a memory 250, and a skew adjuster 260.

The skew adjuster 260 can adjust the skew of the optical pickup unit 110. As discussed above, the controller 240 controls the skew adjuster 260 to adjust the skew within a predetermined range, and computes the envelope size of an RF signal. As such, the controller detects a maximum envelope size, and designates the skew, at the maximum envelope size, as an optimal skew. Accordingly, the controller 240 can control the skew adjuster 260 to compensate for the skew of the optical pickup unit 210, as the optimal value. Other components, except for the skew adjuster 260 and the controller 240, are identical with those in the FIG. 2.

Also, the make up and operational principles of the embodiments shown in FIGS. 2 and 3, respectively, are similar to each other, so they will be further explained collectively hereinafter.

Figure 4A:
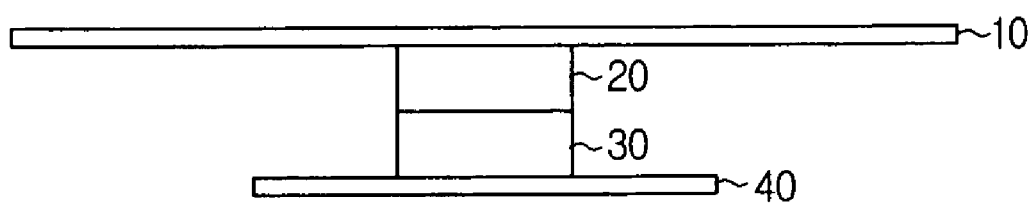
FIGS. 4A and 4B illustrate, respectively, apparatuses for adjusting the tilt of an optical disk and the skew of an optical pickup unit, according to embodiments of the present invention.
Figure 4B:

FIGS. 4A and 4B illustrate, respectively, apparatuses for adjusting the tilt of an optical disk and the skew of an optical pickup unit. As shown in FIG. 4A, the optical disc player includes a spindle 20 for rotatably driving the optical disc 10, a spindle base 40 for supporting the rotation of the spindle 20, and a tilting unit 30 for adjusting the tilt of the optical disc 10. Accordingly, the tilt adjuster 160 applies a drive signal, of an appropriate size, to the tilting unit and adjusts the tilt of the optical disc.

Referring to FIG. 4B, the optical pickup units 110 and 210, emitting the laser beam to the surface of the optical disc 10, may include a light source 211, an actuator 212, and first and second focusing coils 213 and 214. In FIG. 4B, additional hardware, such as a beam splitter for adjusting the direction of the laser beam and an objective lens for focusing the laser beam, are not illustrated. The light source 211 can usually be a laser diode. The actuator 212 can be combined with the light source 211 and move together with the light source 211, in the horizontal direction, to track the beam spot. The first and second focusing coils 213 and 214 can be connected to both sides of the actuator 212. When a drive signal is applied thereto, the focusing coils 213 and 214 lift the actuator 212. As a result thereof, the vertical position of the light source is adjusted, which in turn makes the focusing coils 213 and 214 focus. The skew adjuster 260 can apply a drive signal of a predetermined size to the first and second focusing coils 213 and 214, respectively, to adjust the skew of the optical pickup units 110 and 210.

Figure 5A:
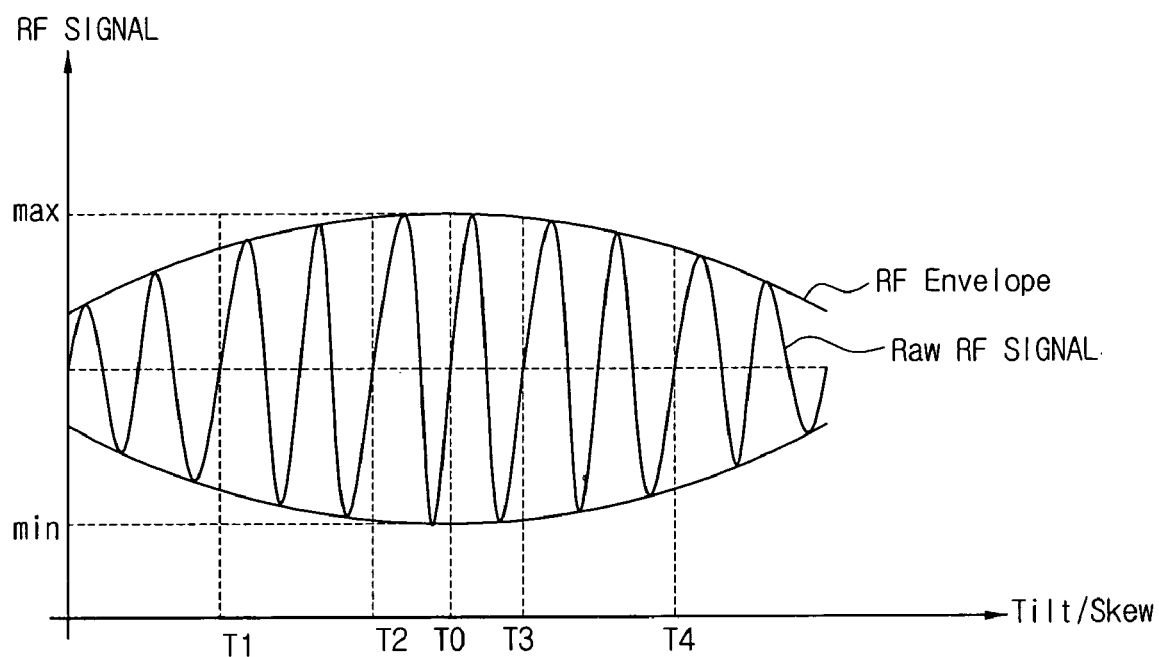
FIG. 5A illustrates an RF signal reproduced from an optical disc and an RF envelope thereof, according to an embodiment of the present invention.
Figure 5B:
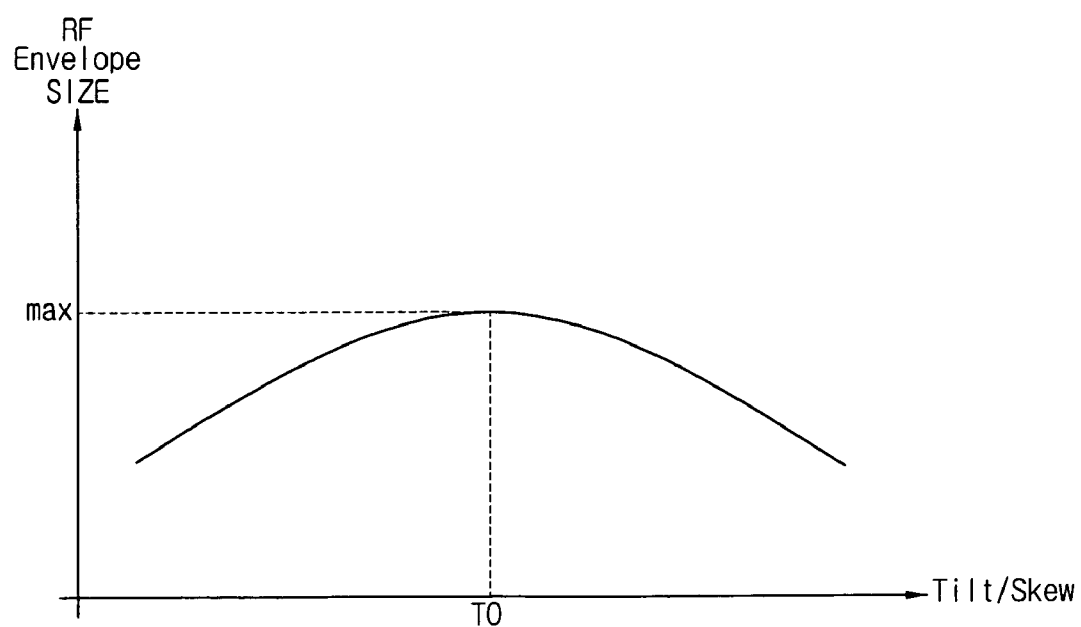
FIG. 5B illustrates a relationship between an envelope size of an RF signal and a tilt/skew, according to an embodiment of the present invention.

FIGS. 5A and 5B illustrate, respectively, a Raw RF signal reproduced, from the corresponding signal processors 120 and 220, and the envelope size of the Raw RF signal. Referring first to FIG. 5A, the Raw RF signal changes with respect to the changes in the tilt or skew (hereinafter referred to as "tilt/skew"), and the envelope is obtained by comparing maximum values and minimum values at each frequency of the Raw RF signal. As shown in FIG. 5A, provided that the optical disc was played while changing the tilt/skew value every two periods T1, T2, T3 and T4 for example, the maximum envelope can be detected between T2 and T3 intervals.

FIG. 5B illustrates the relationship between the envelope size and the tilt/skew. Referring to FIG. 5B, provided that the data was reproduced while the tilt/skew changed only a small amount, the RF signal with the maximum envelope size was detected at T0. Accordingly, the controllers 140 and 240 can control the tilt adjuster 160 or the skew adjuster 260 to make the tilt/skew value=T0, thereby obtaining the optimal tilt/skew.

Figure 6:
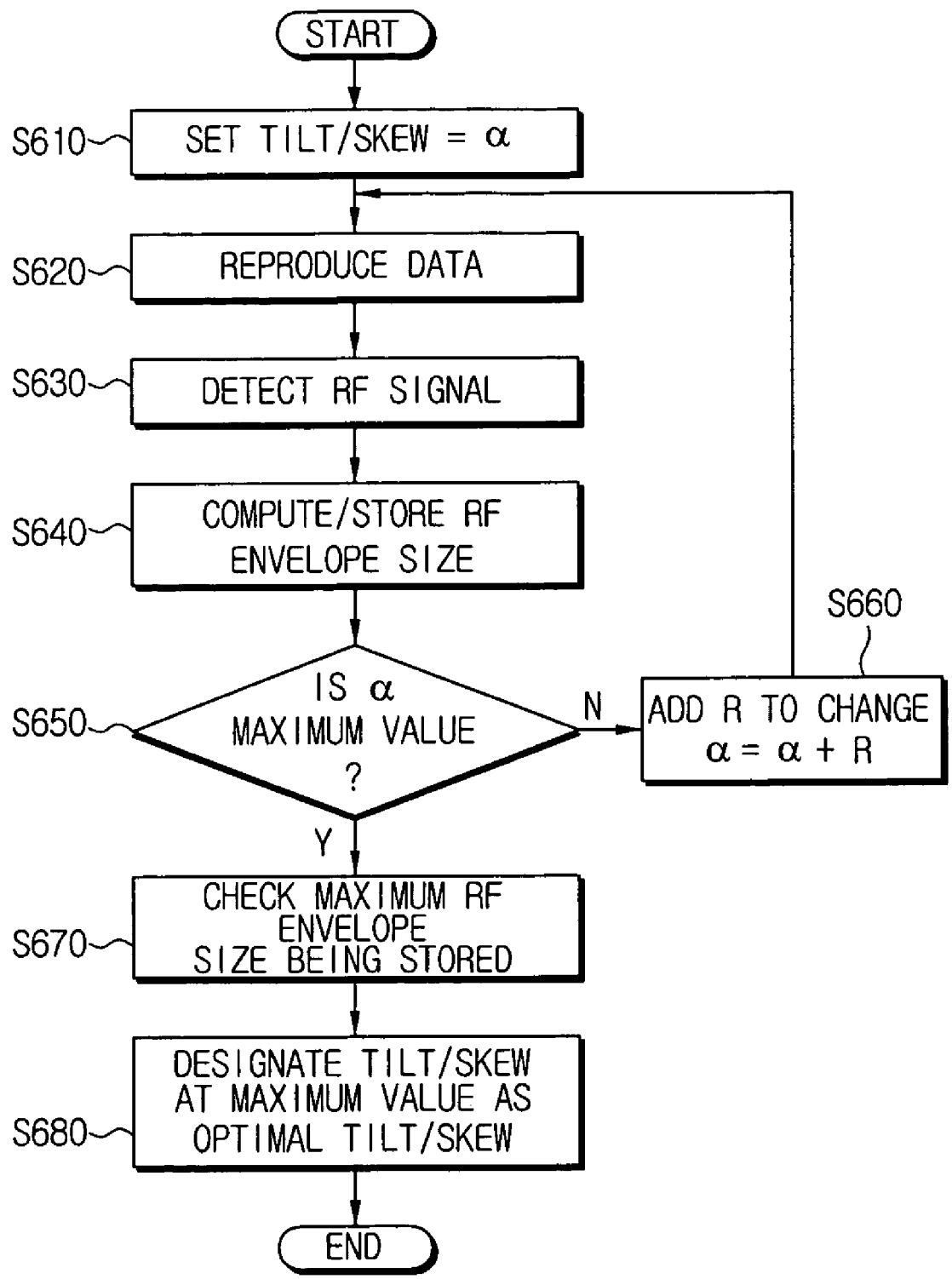
FIG. 6 illustrates a flow chart for a tilt/skew compensation method, according to an embodiment of the present invention.

FIG. 6 illustrates a flow chart for a tilt/skew compensation method, according to an embodiment of the present invention. Referring to FIG. 6, first the controllers 140 and 240 can set the tilt/skew to equal 'α', as an initial value (S610), and control the optical pickup units 110 and 210 to reproduce data (S620).

The reproduced data from the optical pickup units 110 and 210 can be extracted by the signal processors 120 and 220, respectively, and goes through a process (e.g., sampling) (S630). Next, the signal size computing units 130 and 230 can compute the envelope size of the RF signal, and store the computed envelope sized in the memories 150 and 250 (S640).

The controllers 140 and 240 can repeat the above-described procedures, while changing the tilt/skew within the predetermined range (S650, S660). That is, the controllers 140 and 240 can check whether the initial value 'α' is a predetermined maximum value (S650) and if the value 'α' is not a predetermined maximum, the controllers 140 and 240 can increases the value by 'r', i.e., α=α+r (S660). The controllers 140 and 240 can then reproduce data again, and compute/store the envelope size of the RF signal (S620, S630, S640).

If all the tilt/skew values are computed/stored, the controllers 140 and 240 can check a maximum value of the envelope sizes of the RF signal in the memories 150 and 250 (S670).

Then the tilt/skew corresponding to the maximum value of the envelope size can be designated as the optimal tilt/skew (S680). In other words, the optimal tilt/skew with the least jitter can be obtained.

Figure 7:
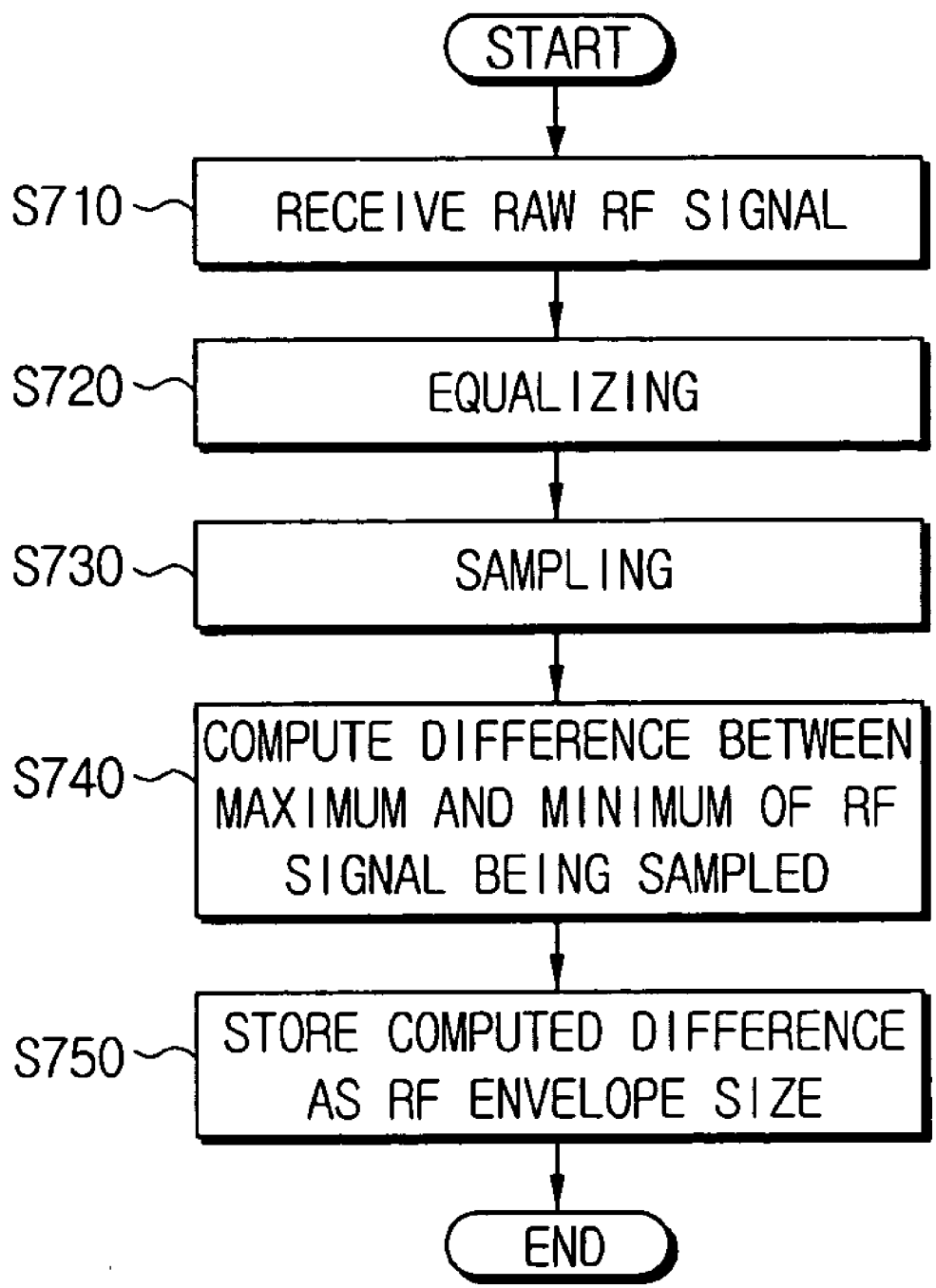
FIG. 7 illustrates a flow chart for a method for computing an envelope size of an RF signal, according to an embodiment of the present invention.

FIG. 7 illustrating a flow chart explaining a method for computing the envelope size of an RF signal, according to an embodiment of the present invention. Referring to FIG. 7, when a Raw RF signal is detected from the optical disc 10 (S710) the signal processor performs the equalizing and sampling on the signal (S720, S730).

Next, the difference between sample values at the maximum RF signal and the minimum RF signal can be computed (S740), and the information on a present tilt/skew and the difference can be stored in the memories 150 and 250 (S750).

Figure 8:
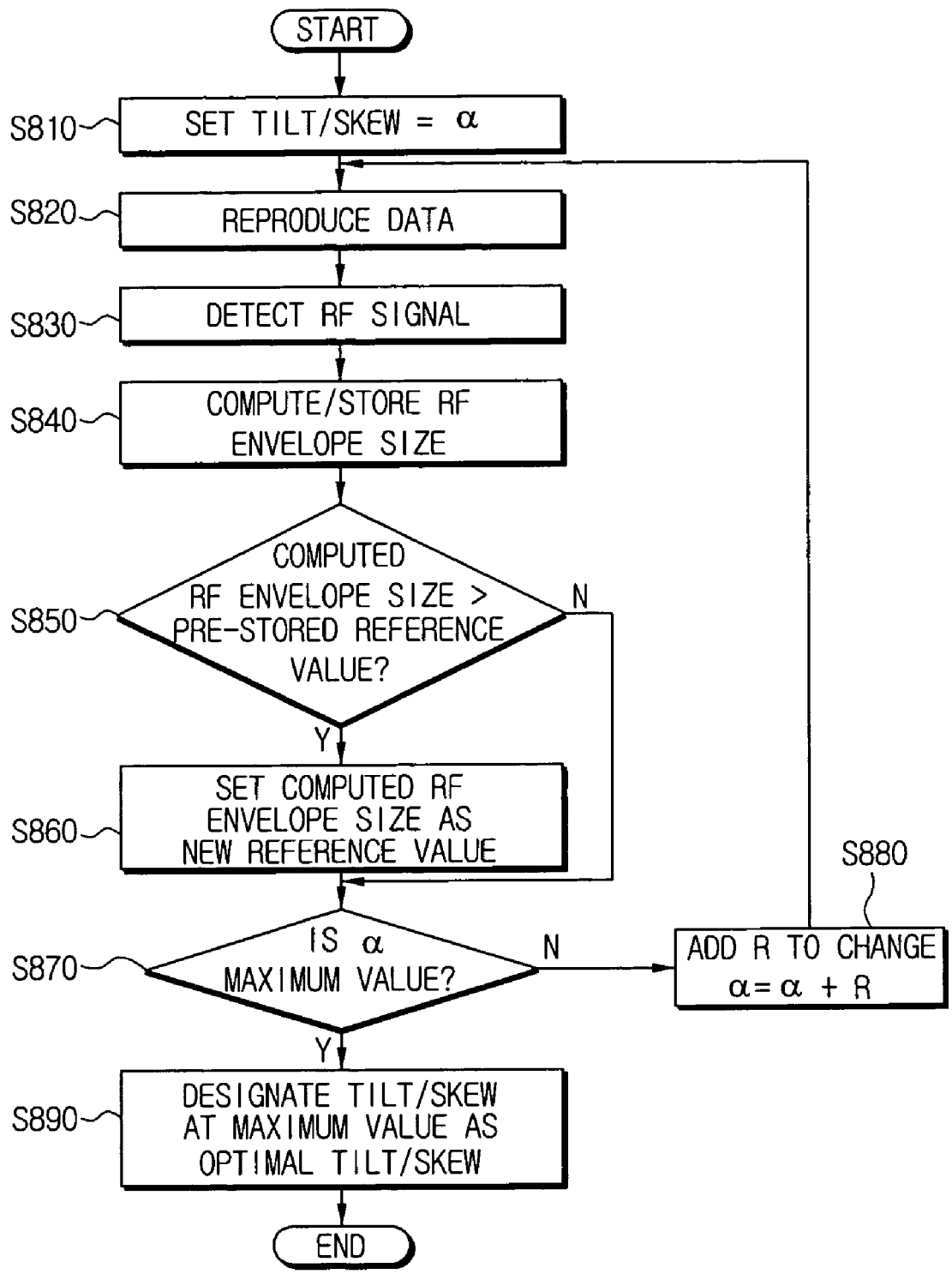
FIG. 8 illustrates a flow chart for a tilt/skew compensation method, according to another embodiment of the present invention.

FIG. 8 illustrates a flow chart explaining a tilt/skew compensation method, according to another embodiment of the present invention. Referring to FIG. 8, the controller sets tilt/skew to equal α (S810), computes the envelope size of an RF signal that is detected during the reproduction of the data, and stores the envelope size (S820, S830, S840). The computed envelope size, from the present tilt/skew, is then compared with a pre-stored reference value (S850). If it turns out that the presently computed envelope size is greater than the reference value, the present envelope size is set as a new reference value (S860). On the other hand, if it turns out that the presently computed envelope size is smaller than the reference value, the reference value is kept (S850).

The controllers 140 and 240 can then repeat the above-described comparison procedures, while changing the tilt/skew within the predetermined range (S870, S880), and if a final reference value is set, the controllers 140 and 240 can determine the optimal tilt/skew using the tilt/skew corresponding to the reference value (S890). Particularly, in embodiments of the present invention, it is not necessary to store all of the envelope sizes over the entire range of the tilt/skew. Thus, the storage capacity of the memories 150 and 250 can be preserved to a great degree.

In addition to the above described embodiments, embodiments of the present invention can also be implemented through computer readable code/instructions in/on a medium, e.g., a computer readable medium. The medium can correspond to any medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. The media may also be a distributed network, so that the computer readable code is stored/transferred and executed in a distributed fashion.

In conclusion, with embodiments of the present invention, it possible to obtain an optimal tilt/skew using an envelope size of a detected RF signal. As such, jitter can be minimized. Since the envelope size of the RF signal is used for compensation of the focusing error or the tracking error, components for tilt/skew compensation only are no longer required. As a result, no additional costs are incurred. Moreover, because a separate operation process for extracting the jitter is no longer required, the required time for data reproduction can be reduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical disc player recording and/or reproducing data recorded on an optical disc, comprising:
    an optical pickup unit to emit a laser beam to a surface of the optical disc and extract an RF signal, from the laser beam reflected from the surface of the optical disc, corresponding to the data;
    a signal size computing unit to compute an envelope size of the RF signal;
    a tilt adjuster to adjust a tilt of the optical disc;
    a controller to designate a tilt of the optical disc at a maximum envelope size as an optimal tilt, and to control the tilt adjuster to change a present tilt of the optical disc based on the optimal; and
    a memory to store the designated tilt and the computed envelope size corresponding to the designated tilt,
    wherein not all computed envelope sizes are stored together.

2. The optical disc player of claim 1, wherein the controller computes the envelope size while changing the present tilt, within a predetermined range, stores the envelope size in the memory, extracts from the memory the designated tilt, and designates the designated tilt as the optimal tilt.

3. An optical disc player for recording and/or reproducing data recorded on an optical disc, comprising:
    an optical pickup unit to emit a laser beam to a surface of the optical disc and extract an RF signal, from the laser beam reflected from the surface of the optical disc, corresponding to the data;
    a signal size computing unit to compute an envelope size of the RF signal;
    a skew adjuster to adjust a skew of the optical pickup;
    a controller to designate the skew of the optical pickup at a maximum envelope size as an optimal skew, and to control the skew adjuster to change a present skew of the optical pickup based on the optimal skew; and
    a memory to store the designated skew and the computed envelope size corresponding to the designated skew,
    wherein not all computed envelope sizes are stored together.

4. The optical disc player of claim 3 wherein the controller computes the envelope size while changing the current skew within a predetermined range, stores the envelope size in the memory, extracts from the memory the designated skew and designates the designated skew at the maximum envelope size as the optimal skew.

5. The optical disc player of claim 3, wherein the skew adjuster applies a drive signal to at least one focusing coil to adjust skew of the optical pickup.

6. A method for compensating a tilt of an optical disc player for recording and/or reproducing data recorded on an optical disc, comprising:
    emitting a laser beam to a surface of the optical disc and extracting an RF signal, from the laser beam reflected from the surface of the optical disc, corresponding to the data;
    computing an envelope size of the RF signal;
    adjusting a tilt of the optical disc within a predetermined range, and repeating the emitting of the laser beam, extracting of the RF signal, and the computing of the envelope size; and
    designating the tilt of the optical disc at a maximum envelope size as an optimal tilt, and changing a present tilt of the optical disc based on the optimal tilt,
    storing each computed envelope size of the RF signal,
    wherein not all computed envelope sizes are stored together.

7. A method for compensating a skew of an optical disc player for recording and/or reproducing data recorded on an optical disc, comprising:
    emitting a laser beam to a surface of the optical disc and extracting an RF signal, from Ithe laser beam reflected from the surface of the optical disc, corresponding to the data;
    computing an envelope size of the RF signal;
    adjusting a skew of an optical pickup up the optical disc player, within a predetermined range, repeating the emitting of the laser beam, extracting of the RF signal, and the computing of the envelope size;
    designating the skew of the optical pickup at a maximum envelope size as an optimal skew, and changing a present skew of the optical pickup based on the optimal skew; and
    storing each computed envelope size of the RF signal,
    wherein not all computed envelope sizes are stored together.

8. The method of claim 7, wherein the adjusting of skew of the optical pickup comprises applying a drive signal to at least one focusing coil.

* * * * *

UNITED STATES PATENT AND TRADEMARK OFFICE
CERTIFICATE OF CORRECTION

PATENT NO. : 7,542,386 B2
APPLICATION NO. : 11/175691
DATED : June 2, 2009
INVENTOR(S) : Min-seok Kim et al.

Page 1 of 1

It is certified that error appears in the above-identified patent and that said Letters Patent is hereby corrected as shown below:

Column 7, Line 58, change "optimal;" to --optimal tilt;--.

Column 8, Line 18, change "claim 3" to --claim 3,--.

Column 8, Line 21, change "skew" to --skew,--.

Column 8, Line 49, change "Ithe" to --the--.

Signed and Sealed this

Twenty-ninth Day of September, 2009

David J. Kappos
*Director of the United States Patent and Trademark Office*